(12) United States Patent
Kim

(10) Patent No.: US 10,414,332 B2
(45) Date of Patent: Sep. 17, 2019

(54) VEHICLE EMERGENCY SAFETY DEVICE USING SELFIE STICK

(71) Applicant: Bong Cheol Kim, Pyeongtaek-si (KR)

(72) Inventor: Kyung-Min Kim, Incheon (KR)

(73) Assignee: Bong Cheol Kim, Pyeongtaek-si (KR)

( * ) Notice: Subject to any disclaimer, the term of this patent is extended or adjusted under 35 U.S.C. 154(b) by 0 days.

(21) Appl. No.: 16/166,079

(22) Filed: Oct. 20, 2018

(65) Prior Publication Data

US 2019/0047467 A1    Feb. 14, 2019

Related U.S. Application Data

(63) Continuation-in-part of application No. 15/567,967, filed as application No. PCT/KR2015/011742 on Nov. 4, 2015.

(30) Foreign Application Priority Data

Oct. 22, 2015  (KR) .................. 10-2015-0147109

(51) Int. Cl.
*B60Q 1/26* (2006.01)
*B60Q 7/00* (2006.01)
(Continued)

(52) U.S. Cl.
CPC .............. *B60Q 1/2657* (2013.01); *B60Q 7/00* (2013.01); *B60Q 1/52* (2013.01); *E01F 9/615* (2016.02);
(Continued)

(58) Field of Classification Search
CPC ... B60Q 1/52; B60Q 7/00; B60Q 7/02; B60Q 3/35; B60Q 3/49; B60Q 3/50; B60Q 3/53;
(Continued)

(56) References Cited

U.S. PATENT DOCUMENTS 4,870,543 A    9/1989  Born et al.
2012/0147585 A1*  6/2012  Girouard .............. B60Q 1/2657
                                              362/84

(Continued)

FOREIGN PATENT DOCUMENTS

KR    20-040946 Y1    7/1989
KR    10-0356225 B1   9/2002
(Continued)

OTHER PUBLICATIONS

KR Notification of Reason for Refusal dated Dec. 1, 2016 as received in Application No. 10-2015-0147109 (English Translation).

(Continued)

*Primary Examiner* — Steven Lim
*Assistant Examiner* — Mancil Littlejohn, Jr.
(74) *Attorney, Agent, or Firm* — Maschoff Brennan

(57) ABSTRACT

The present invention relates to a vehicle emergency safety device using a selfie stick, the device comprising: a support which comprises a plurality of poles with different diameters, including first, second, third, and fourth poles, wherein the poles are successively nested in the first pole with the largest diameter and withdrawn therefrom up to a desired length in a telescopic manner; two fixing brackets installed in the lower portion of the support; a joint part installed in the upper portion of the support; a cradle which is installed in the upper portion of the joint part and can be rotated 360 degrees by a second adjusting screw; and a flashing light inserted into and fixed to the cradle.

4 Claims, 8 Drawing Sheets

(51) Int. Cl.
  *B60Q 1/52* (2006.01)
  *E01F 9/615* (2016.01)
  *E01F 9/662* (2016.01)
  *F16M 13/02* (2006.01)
  *G03B 17/56* (2006.01)

(52) U.S. Cl.
  CPC .............. *E01F 9/662* (2016.02); *F16M 13/02* (2013.01); *G03B 17/561* (2013.01); *G03B 17/563* (2013.01)

(58) Field of Classification Search
  CPC . B60Q 3/56; B60Q 3/57; B60Q 9/005; B60Q 9/008; B60Q 2200/34; B60Q 1/2657; B60Q 1/2692
  See application file for complete search history.

(56) References Cited

U.S. PATENT DOCUMENTS

2012/0235810 A1* 9/2012 McMeekin .......... B60Q 1/2657
                                                    340/473
2013/0176412 A1* 7/2013 Chen ...................... H04N 7/183
                                                    348/77
2016/0091779 A1* 3/2016 Jodoin ................ G03B 17/561
                                                    396/428

FOREIGN PATENT DOCUMENTS

| KR | 20-0352673 Y1 | 5/2004 |
| KR | 10-2005-0041574 A | 5/2005 |
| KR | 10-2006-0005615 A | 1/2006 |
| KR | 10-1170968 B1 | 7/2012 |
| KR | 10-2015-0008071 A | 1/2015 |
| KR | 10-2015-0028277 A | 3/2015 |
| WO | 2006/006814 A1 | 1/2006 |
| WO | 2014/126288 A1 | 8/2014 |
| WO | 2015/124003 A1 | 8/2015 |

OTHER PUBLICATIONS

KR Grant of Patent dated Feb. 20, 2017 as received in Application No. 10-2015-0147109 (English Translation).

* cited by examiner

VEHICLE EMERGENCY SAFETY DEVICE USING SELFIE STICK

TECHNICAL FIELD

The present invention relates to a vehicle emergency safety device using a selfie stick, which is attachable to a vehicle door when a vehicle unavoidably stops due to an accident of the vehicle or another vehicle ahead on a road, and gives an easily recognizable warning to following vehicles to prevent secondary or tertiary accidents.

BACKGROUND ART

Among traffic accidents occurring on motorways, a rate of secondary accidents due to driver inattention, e.g., rear-end collisions caused because an accident is not recognized in advance and crashes into a stationary vehicle on the shoulder of a road, gradually increases and thus loss of life and property also increases.

To inform following vehicles of a hazardous situation ahead on a road or an emergency stop of a vehicle, every vehicle has emergency lights which flicker when manipulated by a driver. In particular, when the vehicle stops on a road or on the shoulder of the road to check an error or breakdown caused while driving, the emergency lights should be turned on and a warning triangle should be placed 100 to 200 m behind the stopped vehicle. Every driver is obliged by the Road Traffic Act to carry and use a warning triangle. The warning triangle is produced to be easily recognizable not only in the daytime but also in the nighttime by reflecting light emitted from headlights. Currently, the warning triangle includes a light-emitting diode, an illuminator, or the like which emits light to increase recognizability and visibility.

A selfie stick includes a cradle for holding a smartphone, and an extendable stick connected to the bottom of the cradle, and retracted when carried and extended when used.

For example, Korean Utility Model Registration No. 20-352673 discloses a detachable signal tube holder for holding an expendable and reusable signal tube containing compressed gunpowder and capable of maintaining a total intensity of light even when the number of emergency lamps or signal tubes thrown onto the ground is reduced, to warn long-distance drivers of a traffic accident, the signal tube holder including a cylindrical body having, at an end thereof, a connection hole to which the signal tube is connected and fixed, a plurality of rotation members hinge-rotatably supported by the end of the cylindrical body and spread in a radial shape, a movable ring spaced apart from a hinge point of the rotation members by a predetermined distance and slidable on the body, a draft spring for generating traction power to move the movable ring with respect to the rotation member supporting end of the body, and a support member hinge-rotatably supported between the movable ring and the rotation members to rotate the rotation members in association with movement of the movable ring.

Korean Utility Model Registration No. 20-40946 discloses a vehicle safety lamp which is turned on by combining a plurality of retractable poles 2, 2', and 2" having different diameters, onto the top of a body 1, mounting a lamp 3 on the top pole 2", coiling a wire 6 on a coiled part 5 produced by coiling a ferroelastic spring 5' around a short shaft 4 in the body 1, to be inserted into the plurality of poles 2, 2', and 2" and wired to the lamp 3, and connecting a power input wire 7 to the wire 6 coiled on the coiled part 6 using a terminal.

Korean Patent Registration No. 10-352673 discloses a detachable signal tube holder for holding an expendable and reusable signal tube containing compressed gunpowder and capable of maintaining a total intensity of light even when the number of emergency lamps or signal tubes thrown onto the ground is reduced, to warn long-distance drivers of a traffic accident, the signal tube holder including a cylindrical body having, at an end thereof, a connection hole to which the signal tube is connected and fixed, a plurality of rotation members hinge-rotatably supported by the end of the cylindrical body and spread in a radial shape, a movable ring spaced apart from a hinge point of the rotation members by a predetermined distance and slidable on the body, a draft spring for generating traction power to move the movable ring with respect to the rotation member supporting end of the body, and a support member hinge-rotatably supported between the movable ring and the rotation members to rotate the rotation members in association with movement of the movable ring.

Korean Patent Registration No. 10-356225 discloses a portable emergency lamp including a height-adjustable light bar assembly 10, a link-combined support stick 11 supporting the light bar assembly 10, a height-variable screw bar 12 of the support stick 11, a belt 13 and a motor 14 for rotating the height-variable screw bar 12, a wire-coiling roller 15 extendable and connectable to a vehicle to supply power to the light bar assembly 10, and a frame 17 for mounting the above elements and having at least four wheels 16.

Korean Patent Publication No. 10-2005-41574 discloses an emergency indication method of a vehicle, by which an indicator body, which selectively operates due to manipulation of a driver or a detection signal of a crash sensor, is mounted on the roof of the vehicle or at a rear side of a trunk, the indicator body is open to display a warning indication at a moment when the running vehicle is suddenly braked or stopped for any reason, and thus drivers of following and oncoming vehicles recognize the indication and are prepared for a hazardous situation, thereby preventing additional accidents.

DISCLOSURE

Technical Problem

Therefore, the present invention has been made in view of the above problems, and it is one object of the present invention to provide a vehicle emergency safety device using a selfie stick, the device being capable of solving problems of the above-described conventional technologies by which a traffic accident within a short distance ahead cannot be recognized if the view is blocked by another vehicle or the like, a driver should personally exit a vehicle and take the risk of accident due to vehicles travelling on a road in order to place a warning triangle at a certain distance behind the vehicle after the driver has an accident and temporarily stops the vehicle on the road or on the shoulder of the road, and the vehicle emergency safety device cannot be easily attached to the vehicle.

Technical Solution

The present invention is an improved version of Korean Patent Application No. 10-2010-0045967 (20100517; Registration No. (Date) 10-01170968 (20120730)) entitled 'Vehicle Emergency Safety Device' and Korean Patent Application No. 10-2014-7029272 entitled 'Vehicle Emergency Safety Device Attachable to Vehicle Door' filed by the present applicant, and provides a vehicle emergency safety device using a selfie stick, which is attachable to a vehicle door and includes a support stick 100 including first, second, third, and fourth poles 110, 120, 130, and 140 having different diameters and extendable to a desired length in a telescopic manner by pulling out the second, third, and fourth poles 120, 130, and 140 sequentially retracted into the first pole 110 having the largest diameter, two fixing clamps 20 provided at a lower part of the support stick 100, a joint 200 provided on the top of the support stick 100, a cradle 300 provided on the top of the joint 200 and 360°-rotatable by a second adjusting screw 260, and a flasher 10 inserted into and fixed to the cradle 300.

Advantageous Effects

A vehicle emergency safety device using a selfie stick, according to the present invention, may be easily and rapidly attached to a vehicle door by anyone.

Since a stopped vehicle may be recognized from 300 m to 1,000 m behind and a driver of a following vehicle may recognize an emergency situation, a rear-end collision due to lack of recognizability may be prevented, danger and inconvenience of placing a warning triangle 100 to 200 m behind and bringing the warning triangle back after the emergency situation ends may be solved, and the emergency situation may be rapidly and correctly recognized by other drivers.

BEST MODE

Figure 1:
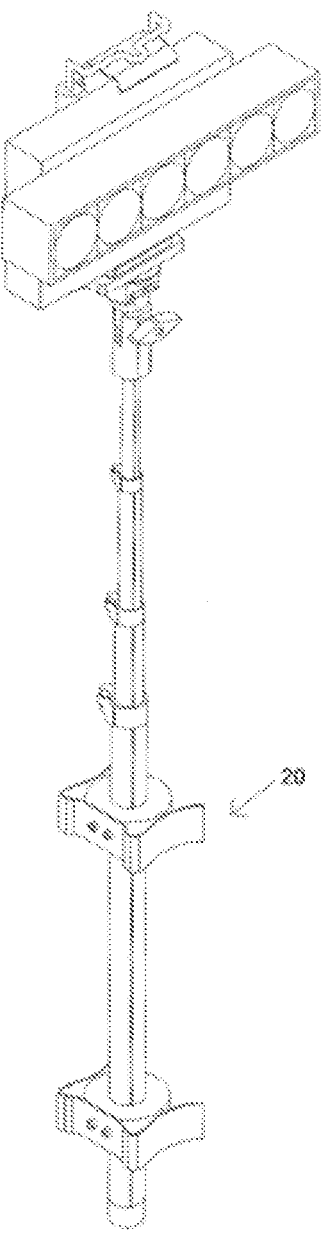
FIG. 1 is a perspective view of a vehicle emergency safety device using a selfie stick, according to the present invention.
Figure 2:
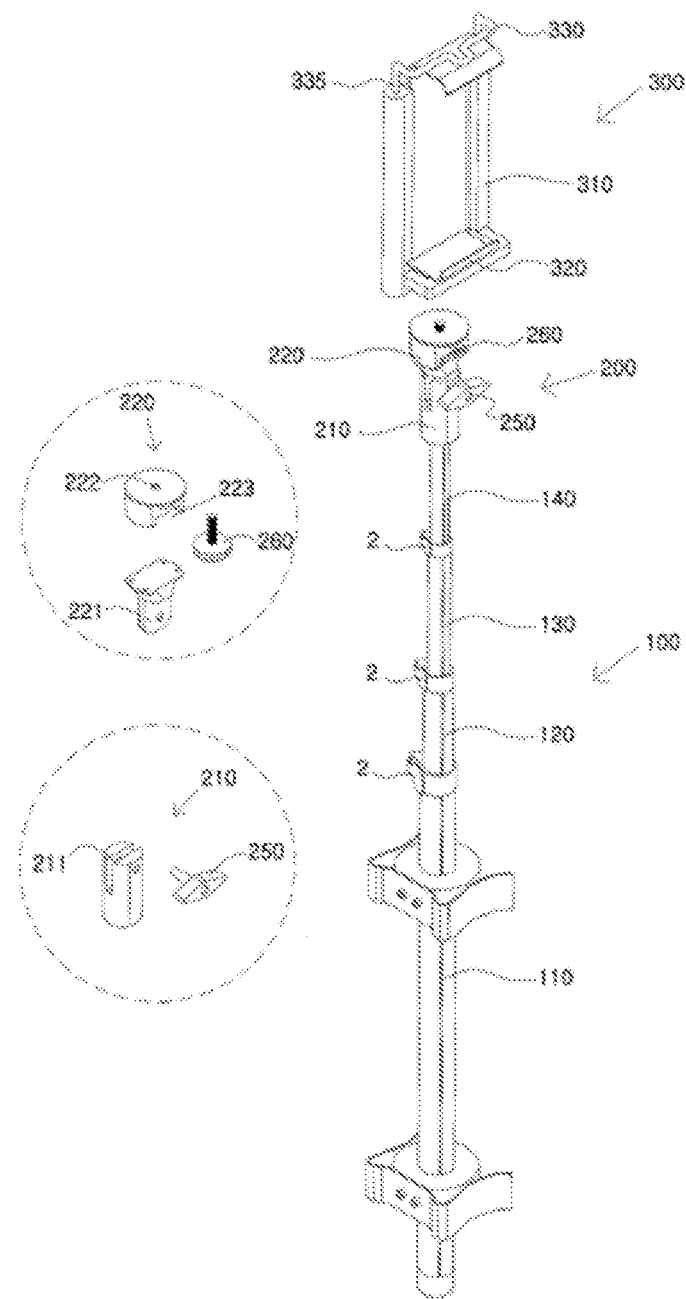
FIG. 2 is a detailed perspective view of the vehicle emergency safety device using the selfie stick, according to the present invention.

The present invention provides a vehicle emergency safety device using a selfie stick, the device including a support stick 100 including first, second, third, and fourth poles 110, 120, 130, and 140 having different diameters and extendable to a desired length in a telescopic manner by pulling out the second, third, and fourth poles 120, 130, and 140 sequentially retracted into the first pole 110 having the largest diameter, two fixing clamps 20 provided at a lower part of the support stick 100, a joint 200 provided on the top of the support stick 100, a cradle 300 provided on the top of the joint 200 and 360°-rotatable by a second adjusting screw 260, and a flasher 10 inserted into and fixed to the cradle 300. As illustrated in FIGS. 1 and 2, the support stick 100 of the vehicle emergency safety device includes the first, second, third, and fourth poles 110, 120, 130, and 140 having different diameters, and is used by pulling out the second, third, and fourth poles 120, 130, and 140 sequentially retracted into the first pole 110 having the largest diameter, to a desired length in a telescopic manner, fitting the flasher 10 into the cradle 300 provided on the top of the fourth pole 140, attaching the device to a side of a vehicle door using the two fixing clamps 20 provided on the first pole 110, spaced apart from each other by a certain distance, and including clips, and then adjusting the joint 200 located between the fourth pole 140 and the cradle 300.

Mode of the Invention

The present invention relates to a vehicle emergency safety device using a selfie stick, the device including a support stick 100 including first, second, third, and fourth poles 110, 120, 130, and 140 having different diameters and extendable to a desired length in a telescopic manner by pulling out the second, third, and fourth poles 120, 130, and 140 sequentially retracted into the first pole 110 having the largest diameter, two fixing clamps 20 provided at a lower part of the support stick 100, a joint 200 provided on the top of the support stick 100, a cradle 300 provided on the top of the joint 200 and 360°-rotatable by a second adjusting screw 260, and a flasher 10 inserted into and fixed to the cradle 300.

As illustrated in FIGS. 1 and 2, the support stick 100 according to the present invention includes the first, second, third, and fourth poles 110, 120, 130, and 140 having different diameters, and is used by pulling out the second, third, and fourth poles 120, 130, and 140 sequentially retracted into the first pole 110 having the largest diameter, to a desired length in a telescopic manner, fitting the flasher 10 into the cradle 300 provided on the top of the fourth pole 140, attaching the device to a side of a vehicle door using the two fixing clamps 20 provided on the first pole 110, spaced apart from each other by a certain distance, and including clips, and then adjusting the joint 200 located between the fourth pole 140 and the cradle 300.

The support stick 100 includes the first, second, third, and fourth poles 110, 120, 130, and 140 and is extendable to a desired length by retracting or extending the second, third, and fourth poles 120, 130, and 140 into or from the first pole 110 having the largest diameter.

The first, second, third, and fourth poles 110, 120, 130, and 140 have different diameters. That is, an upper pole has a smaller diameter than a lower pole. Stoppers 2 are provided at upper ends of the first, second, and third poles 110, 120, and 130 to fix the same after being extended to a certain length.

Figure 5:
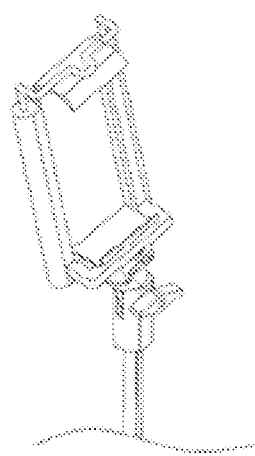
FIG. 5 is a perspective view showing how to use a cradle and a joint according to the present invention.

As illustrated in FIGS. 1, 2, and 5, the joint 200 uses a conventional selfie stick joint and, specifically, includes a fixing member 210 and a hinge member 220. The fixing member 210 is provided at an end of the fourth pole 140, and a hinge member lower part 221 of the hinge member 220 is inserted into and fixed to a fixing member upper recess 211 provided at an upper part of the fixing member 210.

A first adjusting screw 250 penetrates through the fixing member upper recess 211 and the hinge member lower part 221 inserted into the fixing member upper recess 211 in such a manner that an angle of the hinge member 220 is adjustable only in one direction, e.g., a left-right direction or a front-rear direction, by the first adjusting screw 250.

A hinge member upper recess 222 is provided in the top center of the hinge member 220, a hinge member central side slot 223 is horizontally provided, and thus the center of the hinge member 220 may rotate the cradle 300 provided on the top of the joint 200 by 360° and fix the same using the horizontally provided hinge member central side slot 223 and the second adjusting screw 260 provided in the hinge member upper recess 222. As such, an improvement in structure may be achieved.

As illustrated in FIGS. 1, 2, and 5, the cradle 300 is used to hold and fix the flasher 10 including a plurality of light-emitting diodes (LEDs) or the like. The cradle 300 according to the present invention has a "⊏" shape, and a fixed grip 320 provided at a lower part of a body plate 310 and a movable grip 330 provided at an upper part of the body plate 310 are elastically supported in directions toward each other in such a manner that the flasher 10 is pressed and fixed between the fixed grip 320 and the movable grip 330.

Specifically, the fixed grip 320 is integrally provided at an end of the body plate 310, the movable grip 330 includes slidable bars 335 inserted into and vertically slidable along two side grooves of the body plate 310, and elastic means (not shown) for exerting elastic force to move the movable grip 330 toward the fixed grip 320 are provided in the two side grooves of the body plate 310.

Figure 4:
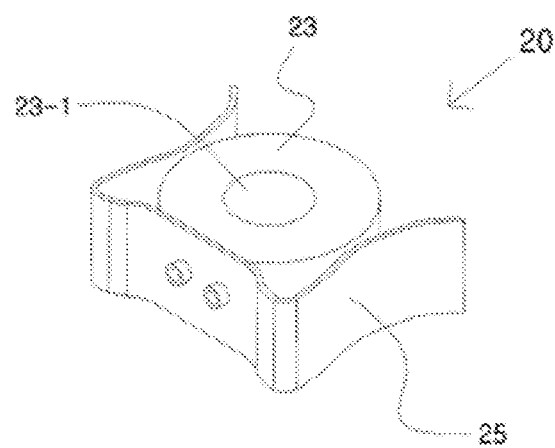
FIG. 4 is a detailed perspective view of a fixing clamp according to the present invention.

As illustrated in FIG. 4, each of the two fixing clamps 20 inserted into and fixed to the support stick 100 and spaced apart from each other by a certain distance includes a fixing ring 23 and a fixing clip 25 attached to the outside of the fixing ring 23, The first pole 110 is inserted into a through-hole 23-1 provided in the center of the fixing ring 23. The fixing clip 25 provided outside the fixing ring 23 is attached and assembled to the fixing ring 23 using bolts and nuts. The fixing clips 25 provided on the fixing clamps 20 are fixed and attached to an end of the vehicle door. As such, an improvement in structure may be achieved.

The present invention will now be described with reference to the attached drawings.

Figure 3:
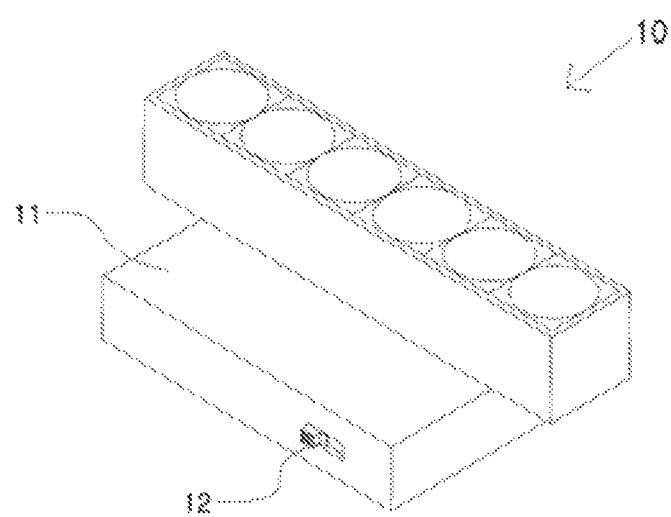
FIG. 3 is a detailed perspective view of a flasher according to the present invention.

FIG. 1 is a perspective view of a vehicle emergency safety device using a selfie stick, according to the present invention, FIG. 2 is a detailed perspective view of the vehicle emergency safety device using the selfie stick, according to the present invention, FIG. 3 is a detailed perspective view of a flasher according to the present invention, FIG. 4 is a detailed perspective view of a fixing clamp according to the present invention, and FIG. 5 is a perspective view showing how to use a cradle and a joint according to the present invention.

FIGS. 1 to 5 illustrate stoppers 2, a flasher 10, a battery case 11, a switch 12, fixing clamps 20, fixing rings 23, through-holes 23-1, fixing clips 25, a support stick 100, first, second, third, and fourth poles 110, 120, 130, and 140, a joint 200, a fixing member 210, a fixing member upper recess 211, a hinge member 220, a hinge member lower part 221, a hinge member upper recess 222, a hinge member central side slot 223, a first adjusting screw 250, a second adjusting screw 260, a cradle 300, a body plate 310, a fixed grip 320, a movable grip 330, and slidable bars 335.

In terms of structure, as illustrated in FIGS. 1 to 4, the vehicle emergency safety device using the selfie stick, according to the present invention, includes the support stick 100 including the first, second, third, and fourth poles 110, 120, 130, and 140 having different diameters and extendable to a desired length in a telescopic manner by pulling out the second, third, and fourth poles 120, 130, and 140 sequentially retracted into the first pole 110 having the largest diameter, two fixing clamps 20 provided at a lower part of the support stick 100, the joint 200 provided on the top of the support stick 100, the cradle 300 provided on the top of the joint 200 and 360°-rotatable by the second adjusting screw 260, and the flasher 10 inserted into and fixed to the cradle 300 and including the battery case 11 and the switch 12.

The support stick 100 includes the first, second, third, and fourth poles 110, 120, 130, and 140 having a pipe shape with grooves at two sides thereof, having diameters sequentially reduced from the bottom to the top, and retracted in a telescopic manner, the stoppers 2 provided at uppermost parts of the first, second, and third poles 110, 120, and 130, and the two fixing clamps 20 provided on the first pole 110 and spaced apart from each other by a certain distance. The fixing clamp 20 includes the fixing ring 23 having a through-hole in the center thereof, and the fixing clip 25 fixed to the outside of the fixing ring 23 using bolts and nuts as illustrated in FIG. 4.

Figure 6:
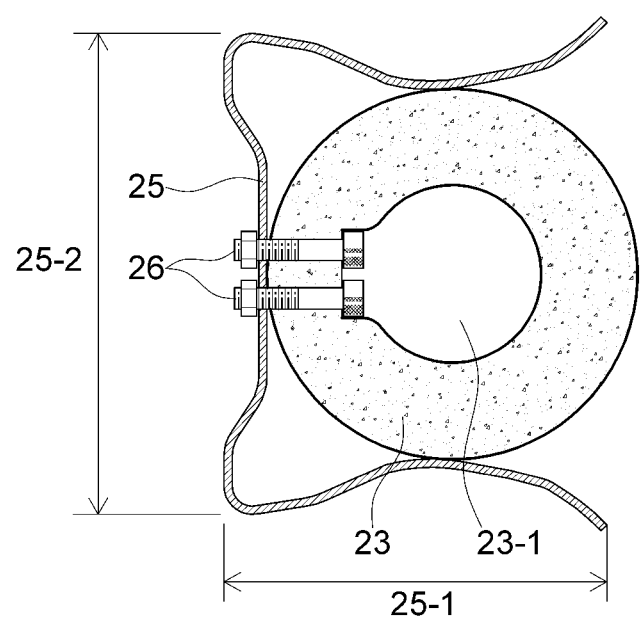
FIG. 6 is a cross-sectional view for describing the structure of a fixing clamp in a vehicle emergency safety device using a selfie stick, according to the present invention.

In more detail, in this case, as illustrated in FIG. 6, each fixing clamp 20 includes a fixing ring 23 including a through-hole 23-1 penetrating through the center of the fixing ring 23 and corresponding to an outer diameter of the support stick 100; and a strip-shaped fixing clip 25 including a support plate 25-2 provided at the length-direction center of the fixing clip 25 and coupled to the fixing ring 23 by fastening members 26, and bent plates 25-1 extending from two length-direction ends of the support plate 25-2 and bent in a direction in which the support plate 25-2 is coupled to the fixing ring 23.

Thus, when the fixing clip 25 is coupled to the fixing ring 23 by fitting the fixing ring 23 between the two bent plates 25-1 of the fixing clip 25 and fastening the fastening members 26 between the through-hole 23-1 of the fixing ring 23 and the support plate 25-2 of the fixing clip 25 and then an end of the first pole 110 is inserted into the through-hole 23-1 of the fixing ring 23, the fixing clamp 20 is easily mounted on the first pole 110.

Length-direction center parts of the two bent plates 25-1 are curved toward each other and elastically press an outer circumferential surface of the fixing ring 23. Therefore, when an end of a vehicle door D is inserted between any one of the bent plates 25-1 and the outer circumferential surface of the fixing ring 23, the end of the vehicle door D is pressed by the bent plate 25-1 and thus the fixing clamp 20 is easily fixed to the vehicle door D. The fixing ring 23 is made of rubber or a synthetic resin that is elastically deformable by physical force.

Thus, since the fixing ring 23 is deformable, e.g., partially extendable or contractible, by external force based on material characteristics thereof, the first pole 110 is smoothly inserted into the through-hole 23-1, and the fixing ring 23 more closely contacts the end of the vehicle door D inserted between the bent plate 25-1 and the fixing ring 23.

The fastening members 26 include any known fastening members capable of firmly coupling the fixing clip 25 to the fixing ring 23, for example, bolts and nuts. Accordingly, the fixing clip 25 is easily coupled to the fixing ring 23 by inserting bolts through the fixing clip 25 from inside the through-hole 23-1 of the fixing ring 23 and then threading nuts on ends of the bolts.

The fixing clip 25 is made of a metal plate having elastic restoring force. Therefore, based on material characteristics of the fixing clip 25, damage of the bent plates 25-1 is minimized and, particularly, the bent plates 25-1 elastically move. Meanwhile, length-direction ends of the bent plates 25-1 are gradually curved away from the fixing ring 23.

Therefore, since the distance between the length-direction ends of the two bent plates 25-1 is greater than the distance between the length-direction center parts thereof, the fixing ring 23 is easily inserted between the two bent plates 25-1. In addition, since the length-direction ends of the bent plates 25-1 are pressed from outside due to, for example, contact with a vehicle frame F, the length-direction center parts of the bent plates 25-1 more closely contact the outer circumferential surface of the fixing ring 23.

The joint 200 includes the fixing member 210 fixed to an end of the fourth pole 140, the hinge member lower part 221 inserted into and fixed to the fixing member upper recess 211 provided at an upper part of the fixing member 210, and having a through-hole in the center thereof, the first adjusting screw 250 penetrating through the fixing member upper recess 211 and the hinge member lower part 221, the hinge member upper recess 222 provided in the top center of the hinge member 220, the hinge member central side slot 223 horizontally provided in the center of the hinge member 220, and the second adjusting screw 260 provided in the hinge member central side slot 223 and having an upper part provided in the hinge member upper recess 222.

The cradle 300 has a "⊏" shape and includes the body plate 310 having body plate grooves (not shown) at two sides thereof, elastic means (not shown) provided in lower parts of the body plate grooves (not shown), the fixed grip 320 provided at a lower part of the body plate 310, and the movable grip 330 provided at an upper part of the body plate 310 and including the slidable bars 335 at two sides thereof. In terms of usage, when an emergency occurs, emergency lights are turned on and a vehicle stops.

The vehicle emergency safety device according to the present invention is taken out of a safety box in a trunk of the vehicle, and then the retracted support stick 100 of the vehicle emergency safety device is extended by pulling out the first, second, third, and fourth poles 110, 120, 130, and 140 in a telescopic manner, and is fixed using the stoppers 2.

The flasher 10 is mounted on the cradle 300 provided on the top of the fourth pole 140 in such a manner that the flasher 10 is pressed and fixed between the fixed grip 320 and the movable grip 330 of the cradle 300, and the flasher 10 is switched on.

The fixing clips 25 of the two fixing clamps 20 provided on the first pole 110 of the support stick 100 and spaced apart from each other by a certain distance are attached to an end of a vehicle door in such a manner that the end of the vehicle door is inserted between the fixing ring 23 and (one of) two sides of the fixing clip 25. The end of the vehicle door D (e.g., a thin part where an inner plate and an outer plate are welded together) is inserted into the fixing clamp 20 mounted on the first pole 110 of the support stick 100.

In the fixing clamp 20 of the present invention, since the bent plates 25-1 of the fixing clip 25 in close contact with the outer circumferential surface of the fixing ring 23 are elastically movable inward and outward, when the end of the vehicle door D is pushed between any one of the bent plates 25-1 and the outer circumferential surface of the fixing ring 23 in contact with the bent plate 25-1, the bent plate 25-1 moves outward, i.e., away from the outer circumferential surface of the fixing ring 23, and thus the end of the vehicle door D is smoothly inserted into the fixing clamp 20.

Figure 7:
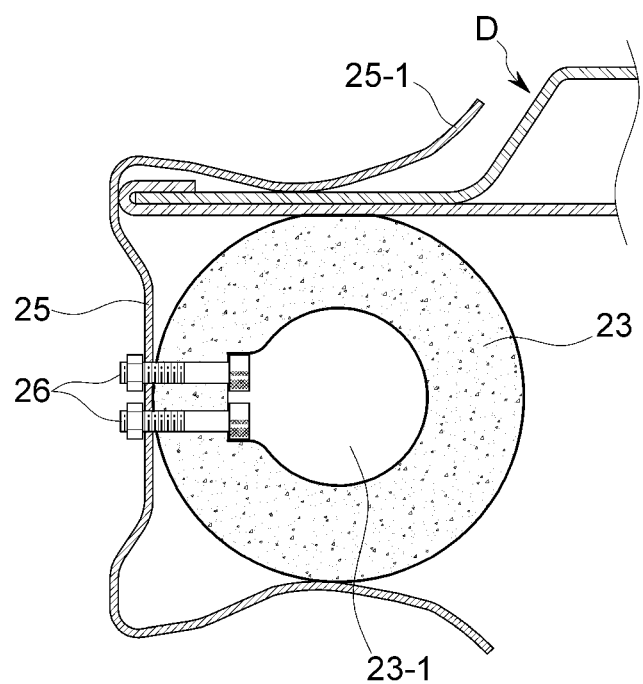
FIG. 7 is a cross-sectional view for describing how to insert an end of a vehicle door into the fixing clamp in the vehicle emergency safety device using the selfie stick, according to the present invention.
Figure 8:
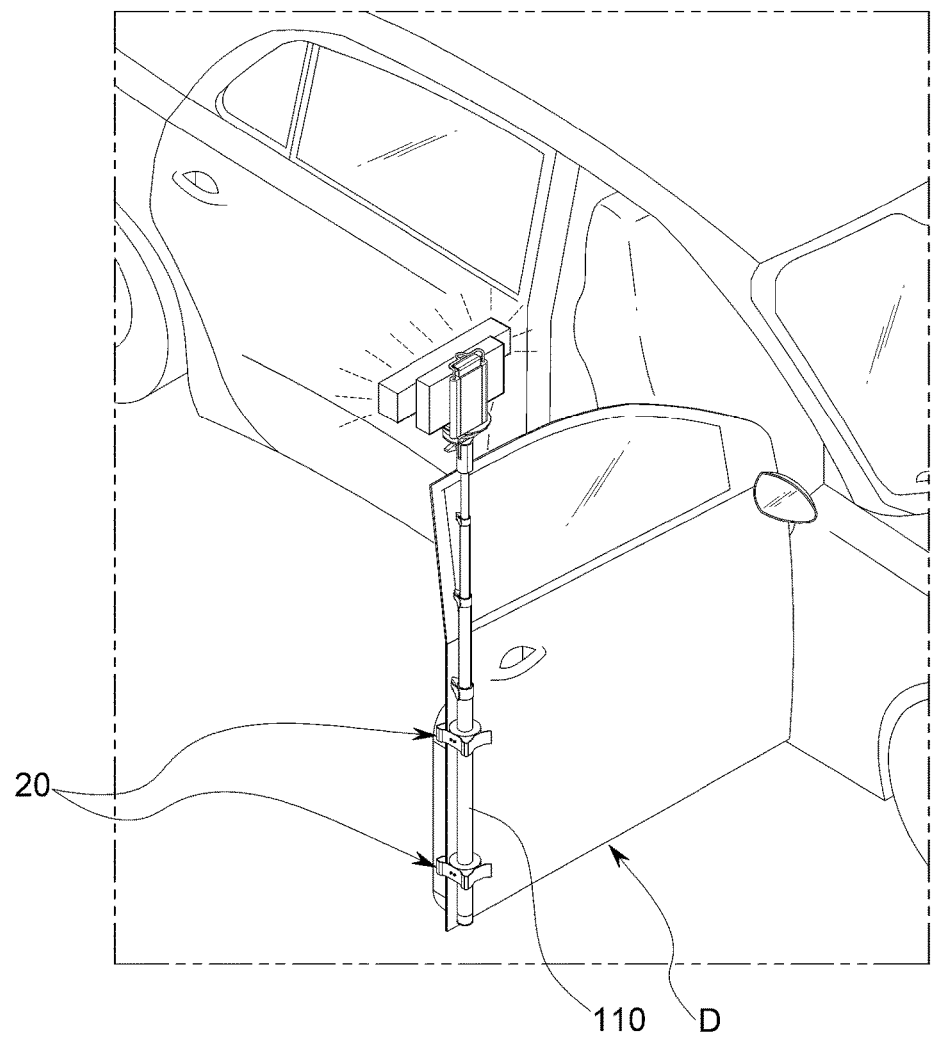
FIG. 8 is a perspective view showing a state in which the vehicle emergency safety device using the selfie stick, according to the present invention, is fixed to an open vehicle door.

In this case, since the bent plate 25-1, which has moved outward when the end of the vehicle door D is inserted, is naturally pushed inward due to elasticity thereof, the end of the vehicle door D inserted into the fixing clamp 20 is caught between the bent plate 25-1 and the fixing ring 23 and thus the fixing clamp 20 is fixed to the vehicle door D as illustrated in FIG. 7. As such, a whole vehicle emergency safety device using a selfie stick, according to the present invention, may be fixed to the vehicle door D as illustrated in FIG. 8. Therefore, an emergency situation of a vehicle may be easily signaled to drivers of following vehicles by rotating a flasher 10 to face backward by adjusting a joint 200 located between a fourth pole 140 and a cradle 300.

Figure 9:
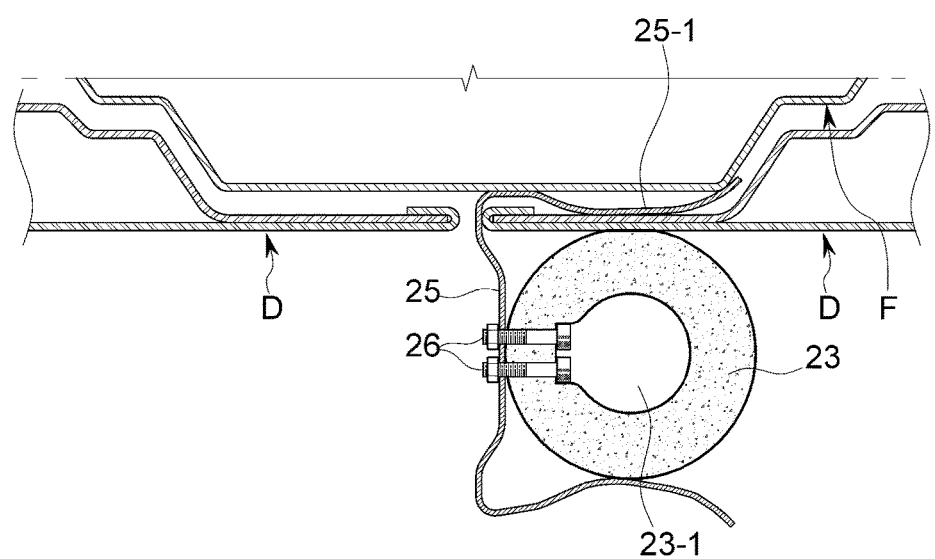
FIG. 9 is a cross-sectional view showing how to insert a fixing clip into a gap between closed vehicle doors in the vehicle emergency safety device using the selfie stick, according to the present invention.

Herein, the fixing clamp 20 may be fixed not only to an open vehicle door D but also to a closed vehicle door D. That is, since a closed front vehicle door D is spaced apart from a closed rear vehicle door D to prevent interference therebetween or to attach a weather strip (not shown) or the like, any one of the bent plates 25-1 of the fixing clip 25 is fitted into a space between the front and rear vehicle doors D as illustrated in FIG. 9 and thus an end of the front or rear vehicle door D is caught between the bent plate 25-1 and the fixing ring 23. As such, the fixing clamp 20 may also be fixed to the closed vehicle door D.

In this case, although insertion of the bent plate 25-1 may be interfered with by the vehicle frame F adjacent to the front and rear vehicle doors D, since the closed front and rear vehicle doors D are also spaced apart from the vehicle frame F, the bent plate 25-1 may be smoothly inserted into the space between the closed front and rear vehicle doors D without interference with the vehicle frame F.

The flasher 10 faces backward by adjusting the joint 200 located between the fourth pole 140 and the cradle 300. Thus, the stopped vehicle may be easily recognized by other vehicles. Thereafter, the vehicle emergency safety device may be detached in reverse order of the above-described method. As such, the vehicle emergency safety device may be used when the vehicle is involved in an accident.

INDUSTRIAL APPLICABILITY

A vehicle emergency safety device using a selfie stick, according to the present invention, may be attached to a vehicle door when a vehicle unavoidably stops due to an accident, and may include a support stick 100 including first, second, third, and fourth poles 110, 120, 130, and 140 having different diameters and extendable to a desired length in a telescopic manner by pulling out the second, third, and fourth poles 120, 130, and 140 sequentially retracted into the first pole 110 having the largest diameter, two fixing clamps 20 provided at a lower part of the support stick 100, a joint 200 provided on the top of the support stick 100, a cradle 300 provided on the top of the joint 200 and 360°-rotatable by a second adjusting screw 260, and a flasher 10 inserted into and fixed to the cradle 300.

The invention claimed is:

1. A vehicle emergency safety device using a selfie stick, the device comprising:
   a support stick comprising first, second, third, and fourth poles having different diameters and extendable to a desired length in a telescopic manner by pulling out the second, third, and fourth poles sequentially retracted into the first pole having the largest diameter;
   two fixing clamps provided at a lower part of the support stick;
   a joint provided on the top of the support stick;
   a cradle provided on the top of the joint and 360-rotatable by a second adjusting screw; and a flasher inserted into and fixed to the cradle and comprising a battery case and a switch,
wherein:
the support stick includes:
the first, second, third, and fourth poles having a pipe shape with grooves at two sides thereof, having diameters sequentially reduced from the bottom to the top, and retracted in a telescopic manner;
stoppers provided at uppermost parts of the first, second, and third poles;
and the two fixing clamps provided on the first pole and spaced apart from each other by a certain distance;
the fixing clamp includes:
a fixing ring having a through-hole in the center thereof, and
a fixing clip fixed to the outside of the fixing ring using bolts and nuts;
the joint includes:
a fixing member fixed to an end of the fourth pole;
a hinge member lower part of a hinge member inserted into and fixed to a fixing member upper recess provided at an upper part of the fixing member, and having a through-hole in the center thereof,
a first adjusting screw penetrating through the fixing member upper recess and the hinge member lower part;
a hinge member upper recess provided in the top center of the hinge member;
a hinge member central side slot horizontally provided in the center of the hinge member; and
the second adjusting screw provided in the hinge member central side slot and having an upper part provided in the hinge member upper recess; and
the cradle has a "⊂" shape and includes:
a body plate having body plate grooves (not shown) at two sides thereof, elastic means provided in lower parts of the body plate grooves;
a fixed grip provided at a lower part of the body plate; and
a movable grip provided at an upper part of the body plate and comprising slidable bars at two sides thereof.

2. A vehicle emergency safety device using a selfie stick, the device comprising:
a support stick; and
a fixing clamp that is mounted on the support stick and includes:
a fixing ring comprising a through-hole penetrating through the center of the fixing ring and corresponding to an outer diameter of the support stick; and a strip-shaped fixing clip comprising a support plate provided at the length-direction center of the fixing clip and coupled to the fixing ring by fastening members, and bent plates extending from two length-direction ends of the support plate and bent in a direction in which the support plate is coupled to the fixing ring; and
wherein length-direction center parts of the two bent plates are curved toward each other and elastically press an outer circumferential surface of the fixing ring,
wherein the fixing ring is made of rubber or a synthetic resin that is elastically deformable by physical force, and the fixing clip is made of a metal plate having elastic restoring force.

3. The vehicle emergency safety device of claim 2, wherein length-direction ends of the bent plates are gradually curved away from the fixing ring.

4. The vehicle emergency safety device of claim 2, wherein two or more fixing clamps are mounted and spaced apart from each other in a length direction of the support stick.

* * * * *